(12) United States Patent
Fujii

(10) Patent No.: US 10,446,146 B2
(45) Date of Patent: Oct. 15, 2019

(54) LEARNING APPARATUS AND METHOD

(71) Applicant: KABUSHIKI KAISHA TOSHIBA, Minato-ku, Tokyo (JP)

(72) Inventor: Hiroko Fujii, Komae Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 174 days.

(21) Appl. No.: 15/427,347

(22) Filed: Feb. 8, 2017

(65) Prior Publication Data

US 2017/0148441 A1 May 25, 2017

Related U.S. Application Data

(63) Continuation of application No. PCT/JP2015/058564, filed on Mar. 20, 2015.

(51) Int. Cl.
*G10L 15/22* (2006.01)
*G06F 17/27* (2006.01)
(Continued)

(52) U.S. Cl.
CPC .......... *G10L 15/22* (2013.01); *G06F 17/2785* (2013.01); *G10L 15/063* (2013.01);
(Continued)

(58) Field of Classification Search
CPC .. G10L 15/22; G10L 15/1815; G06F 17/2785
See application file for complete search history.

(56) References Cited

U.S. PATENT DOCUMENTS 6,192,110 B1 * 2/2001 Abella ................ G06F 17/2715
379/88.01
9,472,196 B1 * 10/2016 Wang ...................... G06F 3/167
(Continued)

FOREIGN PATENT DOCUMENTS

JP 08234789 A 9/1996
JP 2003029782 A 1/2003
(Continued)

OTHER PUBLICATIONS

International Search Report (ISR) and Written Opinion dated Jun. 2, 2015 issued in International Application No. PCT/JP2015/058564.
(Continued)

*Primary Examiner* — Samuel G Neway
(74) *Attorney, Agent, or Firm* — Holtz, Holtz & Volek PC

(57) ABSTRACT

According to one embodiment, a learning apparatus includes a first storage and a processing circuitry. The first storage stores a plurality of similarity information items, each including at least a second text, intention candidates and certainty degrees representing a certainty with which the intention candidates are regarded as being identical to intentions of the second text. The processing circuitry detects corresponding similarity information item including the second text identical to a first text from the plurality of similarity information items, corrects a utterance intention to an intention candidate included in the corresponding similarity information item where a certainty degree included in the corresponding similarity information item is not less than a threshold.

15 Claims, 16 Drawing Sheets

(51) Int. Cl.
*G10L 15/18* (2013.01)
*G10L 15/10* (2006.01)
*G10L 15/06* (2013.01)
*G10L 15/30* (2013.01)

(52) U.S. Cl.
CPC .......... *G10L 15/10* (2013.01); *G10L 15/1815* (2013.01); *G10L 15/30* (2013.01); *G10L 2015/0635* (2013.01)

(56) References Cited

U.S. PATENT DOCUMENTS

| | | | | |
|---|---|---|---|---|
| 2009/0089044 | A1* | 4/2009 | Cooper | G06F 17/275 704/9 |
| 2013/0325468 | A1* | 12/2013 | Lee | G09B 19/04 704/238 |
| 2014/0278413 | A1* | 9/2014 | Pitschel | G10L 15/063 704/243 |
| 2014/0310001 | A1* | 10/2014 | Kalns | G06Q 30/06 704/270.1 |
| 2015/0255064 | A1* | 9/2015 | Fujii | G06F 17/2755 704/257 |
| 2016/0163311 | A1* | 6/2016 | Crook | G10L 15/183 704/275 |
| 2017/0148441 | A1* | 5/2017 | Fujii | G10L 15/10 |

FOREIGN PATENT DOCUMENTS

| | | |
|---|---|---|
| JP | 2007264128 A | 10/2007 |
| JP | 2009025538 A | 2/2009 |
| JP | 2012003702 A | 1/2012 |
| JP | 2012164267 A | 8/2012 |
| JP | 2013050605 A | 3/2013 |
| JP | 2014508968 A | 4/2014 |
| JP | 2014145842 A | 8/2014 |

OTHER PUBLICATIONS

Yuki Irie, et al., "Speech Intention Understanding based on Spoken Dialogue Corpus", Dai 38 Kai Reports of the Meeting of Special Internet Group on Spoken Language Understanding and Dialogue Processing (SIG-SLUD-A301), Jul. 4, 2003, pp. 7-12.

* cited by examiner

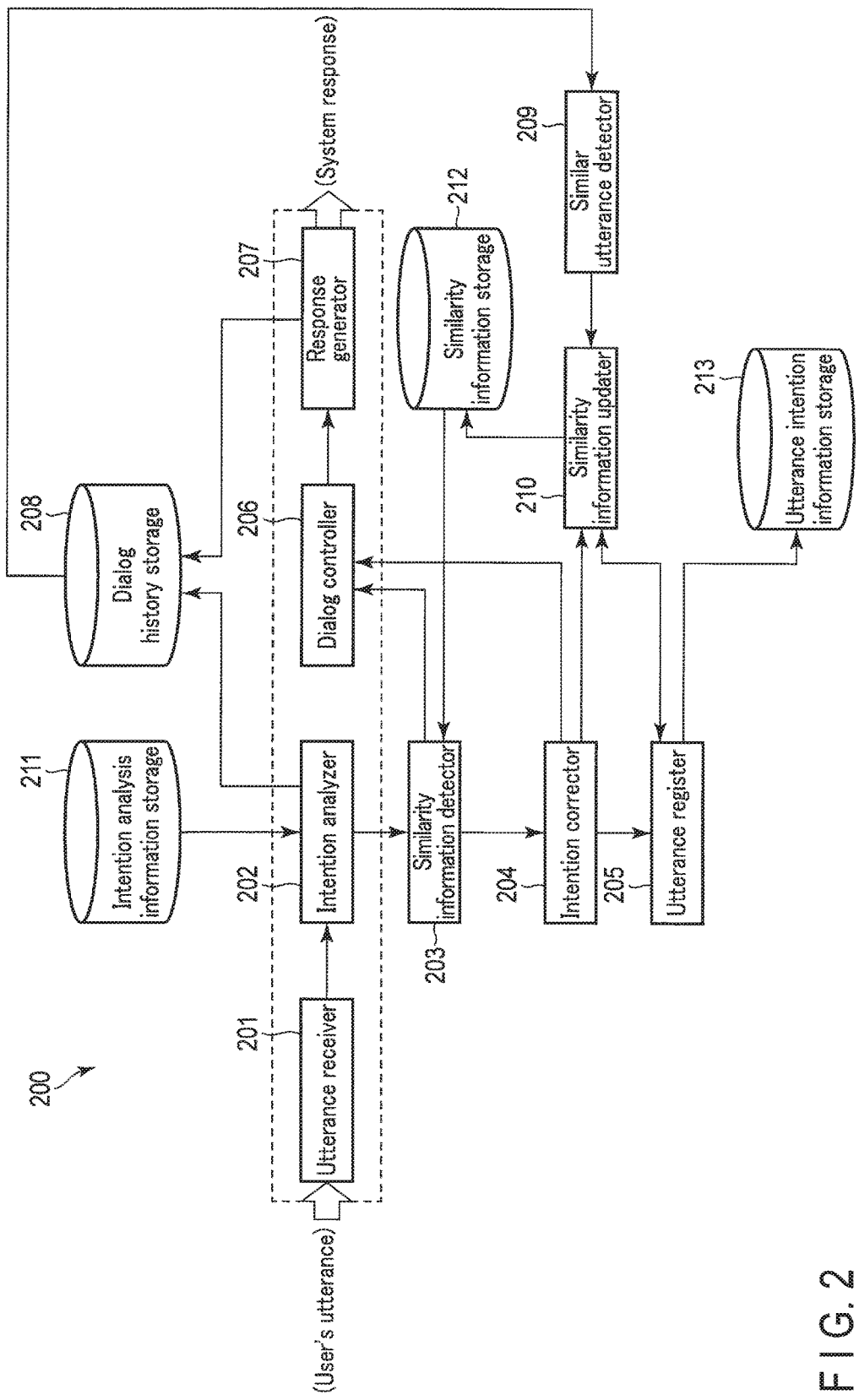
F I G. 2

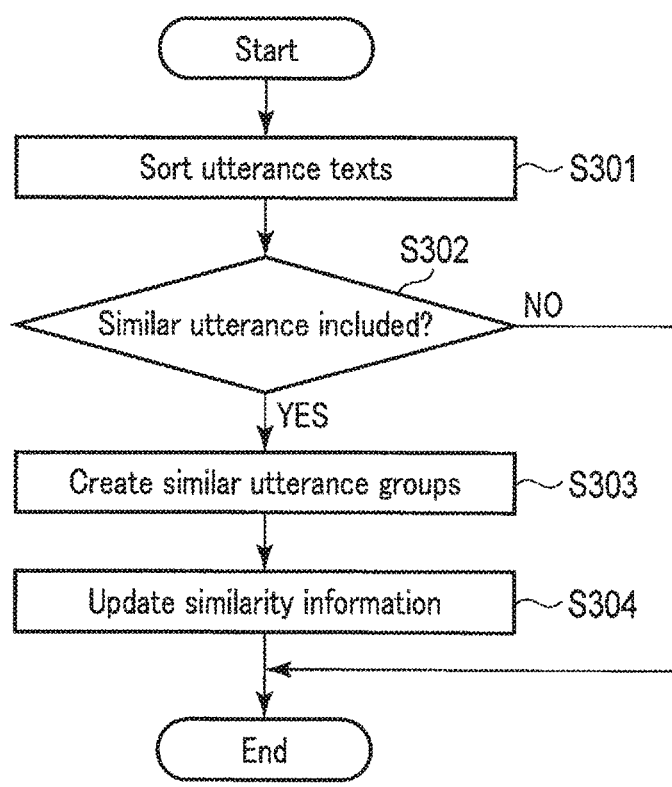
F I G. 3

| Utterance text | Intention candidate | Representative similar utterance | Frequency of appearance |
|---|---|---|---|
| I don't know where my seal is | Loss of seal | I failed to find my registered seal | 20 |
| My seal ⋯ | Loss of seal | I failed to find my registered seal | 1 |

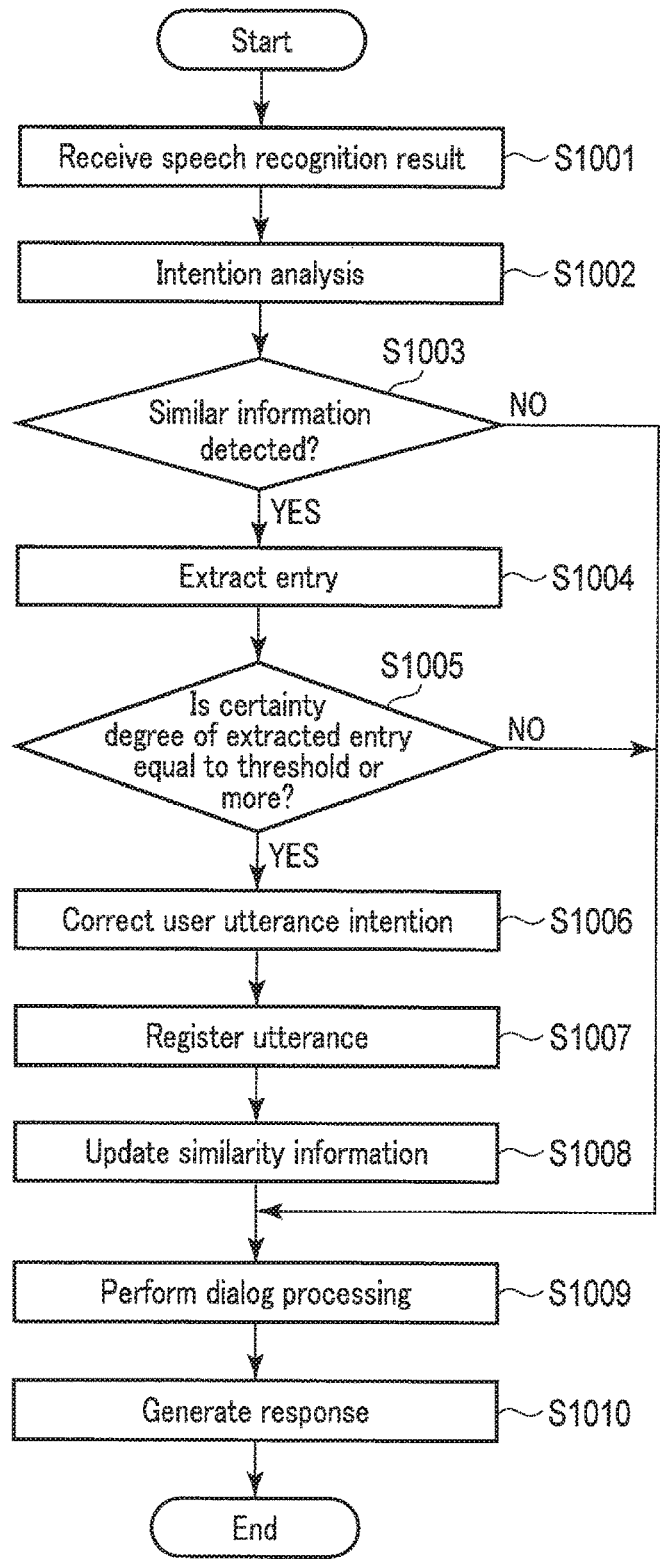
F I G. 10

| Utterance intention identifier | Utterance text |
|---|---|
| Swell (eyelid) | My eyelid has become swollen |
| Pain (thigh) | The rear portion of my thigh hurts |
| Pain (knee) | My knee hurts |
| Pain (thigh) | The back portion of my thigh is tingling |

F I G. 11

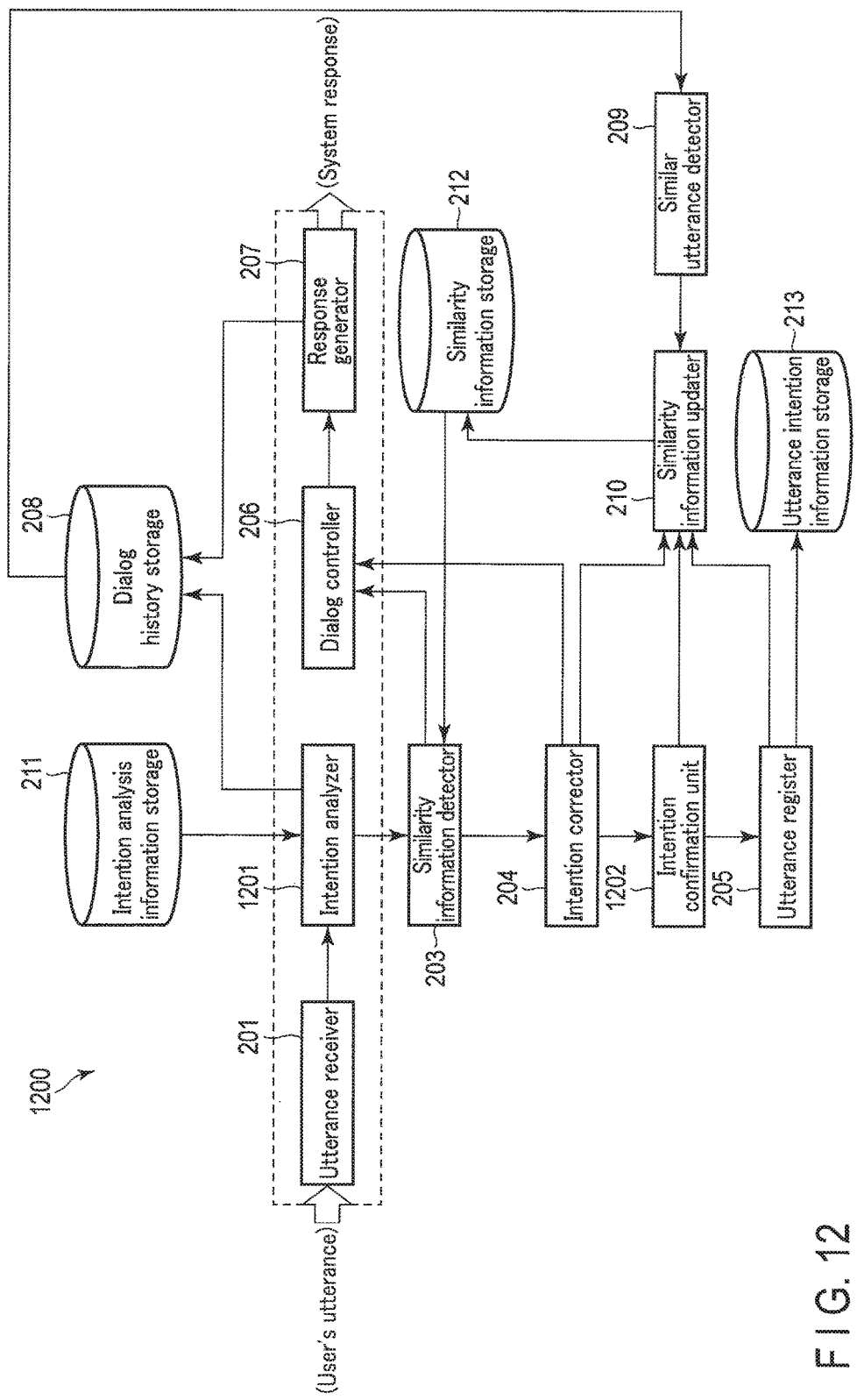
F I G. 12

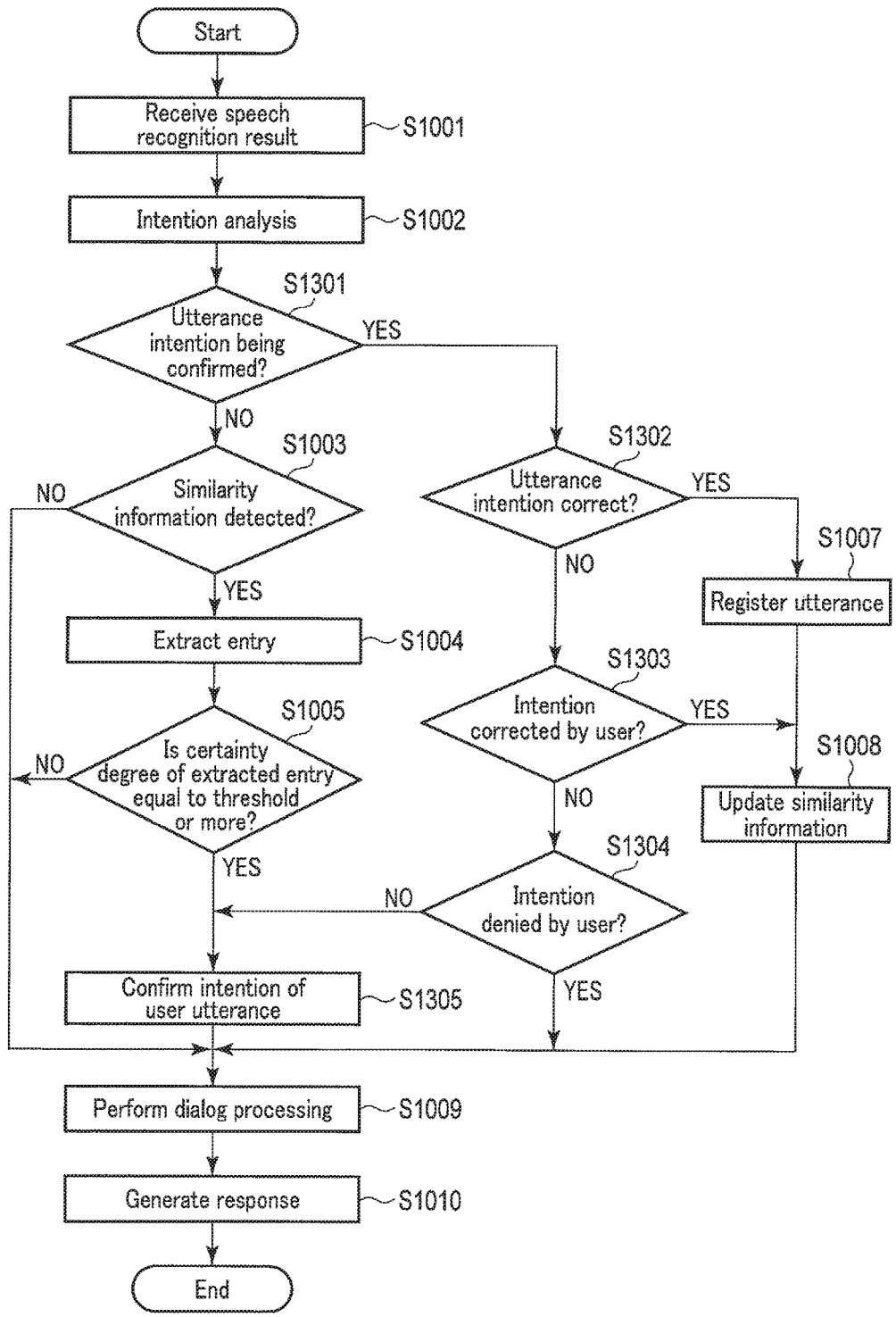
F I G. 13

| Utterance text | Intention candidate | Representative similar utterance | Frequency of appearance | |
|---|---|---|---|---|
| The back portion of my thigh is tingling | Pain (thigh) | The rear portion of my thigh hurts | 20 | ~501 |
| The back portion of my thigh is tingling | Throbbing (thigh) | | 1 | ~1402 |
| The rear portion of my thigh xxx | Pain (thigh) | The rear portion of my thigh hurts | 1 | |

F I G. 14

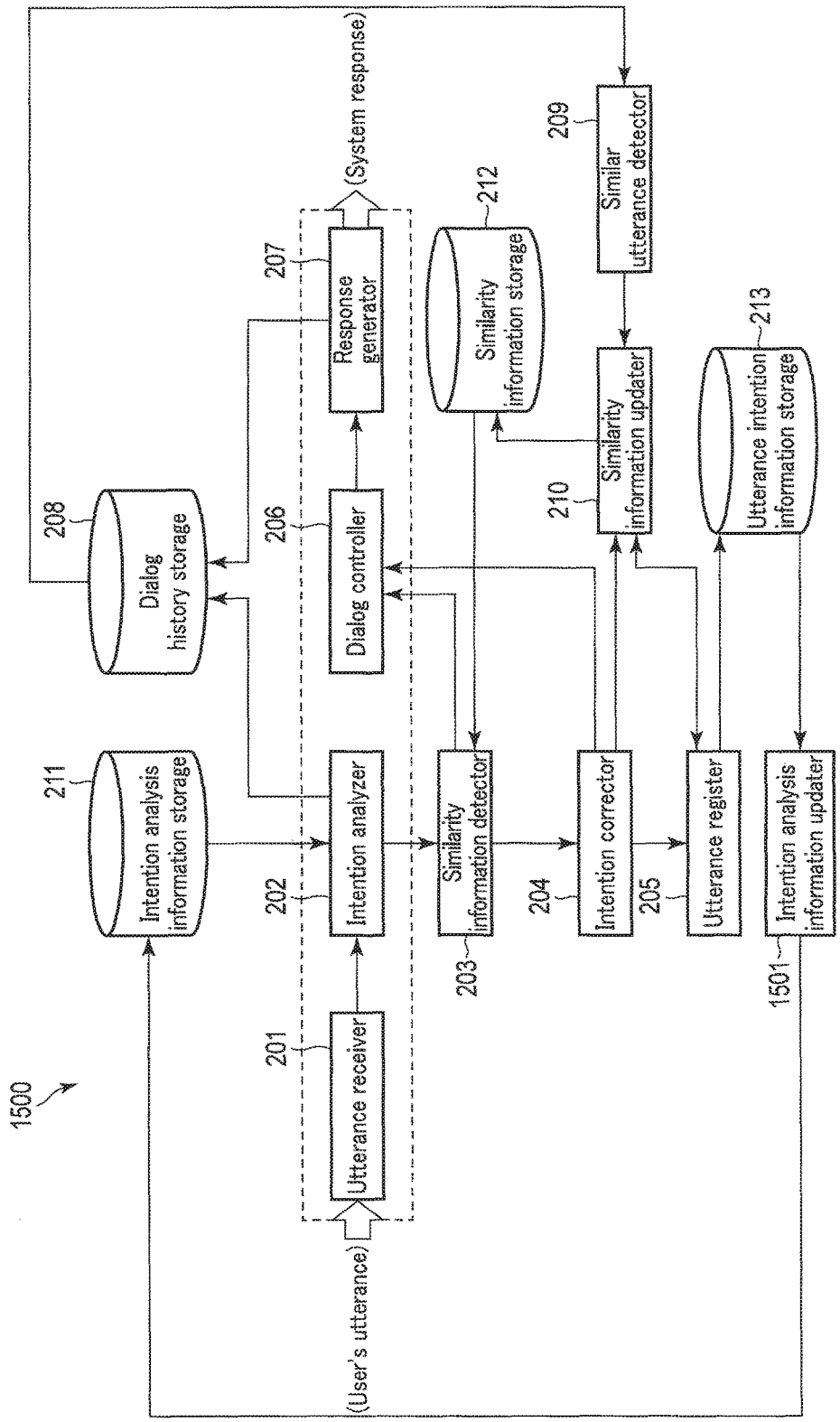
F I G. 15

Time series

U : The back portion of my thigh is tingling. — 1902
S : The rear portion of your thigh hurts, right?... — 1903
U : No, the back portion of my thigh is throbbing. — 1904
S : The rear portion of your thigh is throbbing, right?...
......

1901

F I G. 19

| User utterance inference information (2002) | Utterance text (502) | Intention candidate (504) | Representative similar utterance (503) | Frequency of appearance (505) |
|---|---|---|---|---|
| throbbing (thigh) | The back portion of my thigh is tingling | Pain (thigh) | The rear portion of my thigh hurts | 32 |

2001

F I G. 20

LEARNING APPARATUS AND METHOD

CROSS-REFERENCE TO RELATED APPLICATIONS

This application is a Continuation application of PCT Application No. PCT/JP2015/058564, filed Mar. 20, 2015, the entire contents of which are incorporated herein by reference.

FIELD

Embodiments described herein relate generally to a learning apparatus and method.

BACKGROUND

In recent years, small mobile terminals such as smartphones are in widespread use, and in accordance therewith dialog systems responding to freely given utterances are also in wide use. Since it is not possible to predict what the user will utter to a dialog system, there may be a case where the dialog system cannot correctly interpret the intention of a user's speech (user's utterance). In such a case, the system may mistake the user's utterance and respond to it based on the misunderstanding of the intention. Alternatively, the system may fail to infer the intention of the user's utterance and request that the user repeat the same utterance. Since the user has to repeat the utterance or speak for the sake of correction until the system correctly understands the user's utterance, the case mentioned above should be avoided to a possible degree. It is, however, very costly to identify utterances which cannot be correctly understood by the system, add new rules, or perform learning again, with correct intentions added.

To solve the above problem, the possibility of making the same error is reduced by using a plurality of recognition result candidates presented to a user's utterance and recognition scores of the speech recognition results.

BRIEF DESCRIPTION OF THE DRAWINGS

FIG. 2 is a block diagram of a learning apparatus according to the first embodiment.

FIG. 3 is a flowchart illustrating similarity information updating processing performed by the learning apparatus.

FIG. 10 is a flowchart illustrating utterance registration processing performed by the learning apparatus of the first embodiment.

FIG. 11 shows an example of utterance intention information stored in an utterance intention information storage.

FIG. 12 is a block diagram of a learning apparatus according to the second embodiment.

FIG. 13 is a flowchart illustrating utterance registration processing performed by the learning apparatus of the second embodiment.

FIG. 14 shows an example of similarity information stored in a similarity information storage according to the second embodiment.

FIG. 15 is a block diagram illustrating a learning apparatus according to a third embodiment.

FIG. 19 illustrates a second example of part of a dialog history according to the fourth embodiment.

FIG. 20 illustrates similarity information corresponding to the dialog history shown in FIG. 19.

DETAILED DESCRIPTION

Where a recognition score is high, the user's utterance is not confirmed. Therefore, if the recognition score is high but the intention inference of the user's utterance is incorrect, the user has to repeat the same utterance. In addition, there may be different intentions corresponding to the same utterance. Therefore, the intention inference may be incorrect even if the recognition score is high.

In general, according to one embodiment, a learning apparatus uses utterance intention of a user, the utterance intention being inferred from a first text representing results of speech recognition of user's utterances. The learning apparatus includes a first storage and a processing circuitry. The first storage stores a plurality of similarity information items, each including at least a second text representing results of speech recognition of a set of similar utterances included in a dialog history, intention candidates inferred based on utterances included in the similar utterances and considered to result in successful dialogs, and certainty degrees representing a certainty with which the intention candidates are regarded as being identical to intentions of the second text. The processing circuitry detects a similarity information item as a corresponding similarity information item from the plurality of similarity information items, the corresponding similarity information item including the second text identical to the first text, corrects the utterance intention to an intention candidate included in the corresponding similarity information item where a certainty degree included in the corresponding similarity information item is not less than a threshold.

Hereinafter, a learning apparatus, method and program according to the present embodiment will be described in detail with reference to the accompanying drawings. In the embodiments described below, elements assigned with the same reference symbols perform the same operations, and redundant descriptions such elements will be omitted as appropriate.

(First Embodiment)

An example of a dialog system on which the embodiment is based will be described with reference to the conceptual diagram shown in FIG. 1.

Figure 1:
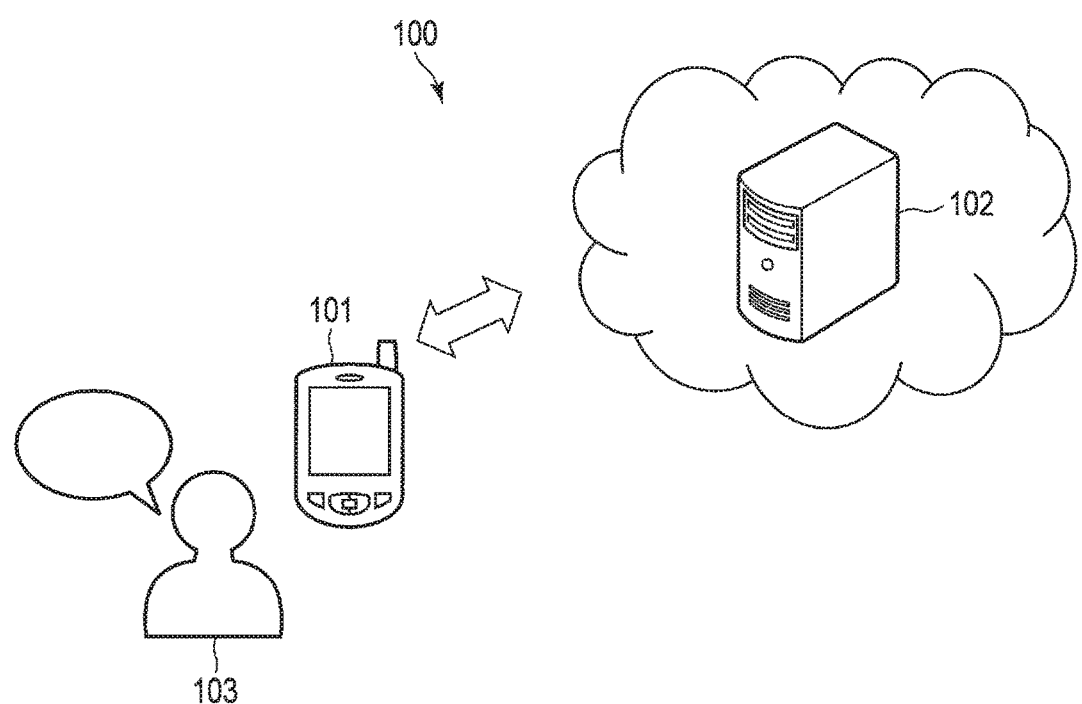
FIG. 1 is a conceptual diagram showing an example of a dialog system.

The dialog system 100 shown in FIG. 1 includes a terminal 101 and a dialog processing server 102. It is assumed here that the terminal 101 is a tablet terminal or a mobile phone (such as a smartphone) used by a user 103. In the present embodiment, it is assumed that the user 103 performs speech input to a client application installed in the terminal 101, but text input may be processed in a similar manner.

The dialog processing server 102 is connected to the terminal 101 by way of a network 104, receives a speech signal entered to the terminal 101, and performs speech recognition for the speech signal, thereby obtaining a speech recognition result. The dialog processing server 102 operates as a dialog system, which infers the user's intention from the speech recognition result, performs processing in accordance with the intention, and performs response processing to the speech recognition result based on the processing result. As the response processing, synthesized speech may be generated by the speech synthesis of a response text, a response to the speech recognition result, and the generated synthesized speech is transmitted to the terminal 101. Although the dialog processing server 102 was described as performing both the speech recognition processing and the speech synthesis processing, a speech recognition server and a speech synthesis server may be prepared independently of the dialog processing server 102. In this case, the speech recognition server performs speech recognition processing and the speech synthesis server performs speech synthesis processing.

A learning apparatus according to the first embodiment will be described with reference to the block diagram shown in FIG. 2.

The learning apparatus 200 of the first embodiment includes an utterance receiver 201, an intention analyzer 202, a similarity information detector 203, an intention corrector 204, an utterance register 205, a dialog controller 206, a response generator 207, a dialog history storage 208 (referred to as a second storage as well), a similar utterance detector 209, a similarity information updater 210 (referred to as a first updater as well), an intention analysis information storage 211, similarity information storage 212 (referred to as a first storage as well) and an utterance intention information storage 213.

The utterance receiver 201, the intention analyzer 202, the dialog controller 206 and the response generator 207 are elements incorporated in a general dialog processing apparatus. It should be noted that the learning apparatus 200 of the present embodiment includes a dialog processing apparatus.

The utterance receiver 201 receives an utterance given by the user, for example, at the microphone of the terminal 101 shown in FIG. 1, and performs speech recognition with respect to the utterance. The utterance receiver 201 acquires a speech-recognized text as an utterance text. In the present embodiment, it is assumed that the user's speech is transmitted to an external speech recognition server, for speech recognition, and that a text representing a speech recognition result is received from the speech recognition server.

The intention analyzer 202 receives an utterance text from the utterance receiver 201, performs intention analysis for the utterance text, by referring to the intention analysis information storage 211, described later, and infers the utterance intention of the user.

The similarity information detector 203 receives an utterance text and an utterance intention from the intention analyzer 202, and determines whether the utterance text is identical to a text included in the similarity information stored in the similarity information storage 212. If the similarity information storage 212 stores similarity information including the text identical to the utterance text, then that similarity information (referred to as corresponding similarity information as well) is detected. If the similarity information storage 212 does not store similarity information including the text identical to the utterance text, the similarity information detector 203 sends the utterance text and utterance intention to the dialog controller 206 as they are.

The intention corrector 204 receives the utterance text, the utterance intention and the corresponding similarity information from the similarity information detector 203. If the certainty degree (mentioned later) of similarity information is a threshold or more, the intention corrector 204 corrects the utterance intention of the user to an intention candidate included in the similarity information.

The utterance register 205 receives the utterance text and corrected utterance intention from the intention corrector 204, and registers a pair made up of the utterance text and the utterance intention in the utterance intention information storage 213. The utterance register 205 may receive an utterance text from the utterance receiver 201.

Where the utterance intention is not corrected, the dialog controller 206 receives the utterance text and the utterance intention from the similarity information detector 203, performs dialog processing, and generates a dialog processing result. Where the utterance intention is corrected, the dialog controller 206 receives the utterance text and the corrected utterance intention from the intention corrector 204, performs dialog processing, and generates a dialog processing result.

The response generator 207 receives the dialog processing result from the dialog controller 206, generates a response text based on the dialog processing result, and transmits or presents the generated response text to an external device (a client).

The dialog history storage 208 receives the utterance text from the intention analyzer 202 and the response text from the response generator 207, and stores the received data as a dialog history. The dialog history will be described later with reference to FIG. 5.

The similar utterance detector 209 detects an unprocessed dialog history from the dialog history storage 208, extracts similar utterances including a series of utterances similar to utterances which are determined as a successful dialog when only utterance texts of the same user ID are arranged in time series, and generates a similar utterance group of similar utterances. The user ID is an identifier used for specifying to which dialog user's utterances belong, when the dialog processing server 102 processes requests made by a plurality of clients. The user ID need not be an identifier peculiar to each user. It may be uniquely determined for each client terminal used by a number of users, or for each session (with such a granularity as enables determination of whether a user's utterance is given during a dialog in progress or is given with the intention to start a new dialog).

The similarity information updater 210 receives a similar utterance group from the similar utterance detector 209 and updates similarity information to be stored in the similarity information storage 212, based on the information on the similar utterance group. Where a corrected utterance intention and an utterance text are received from the intention corrector 204, the similarity information updater 210 updates the similarity information stored in the similarity information storage 212, based on the contents of the corrected utterance intention and utterance text. Where a registration flag is received from the utterance register 205, the similarity information updater 210 registers that flag in the similarity information storage 212.

The intention analysis information storage 211 stores statistical data generally used for the intention inference processing of speech dialog processing. For example, the intention analysis information storage 211 associates an utterance intention ID (indicating the kind of utterance intention defined beforehand) and an utterance text corresponding to the utterance intention ID with each other, and obtains a pair of these as learning data by machine learning. That is, the intention analysis information storage 211 stores statistic data regarding the utterance intention ID and utterance text.

The similarity information storage 212 stores similarity information including an utterance text representing results of speech recognition of a set of similar utterances included in a dialog history, intention candidates that are inferred based on utterances included in the similar utterances and considered to result in successful dialogs, and certainty degrees representing the certainty with which the intention candidates are regarded as the same as the intentions of the second text. Details of the similarity information storage 212 will be described later, for example, with reference to FIG. 5.

The utterance intention information storage 213 associates an utterance text and an utterance intention (if corrected, a corrected utterance intention) with each other and store them as a pair. Details of the utterance intention information storage 213 will be detailed later with reference to FIG. 11.

Next, the similarity information updating processing performed by the learning apparatus 200 will be described with reference to the flowchart of FIG. 3.

In step S301, the similar utterance detector 209 detects part of an unprocessed dialog history from the dialog history stored in the dialog history storage 208, and sorts the utterance texts of the extracted dialog history according to user IDs and times. Whether a dialog history is processed or not can be determined by attaching a flag indicative of the end of processing to a processed utterance text. That is, the similar utterance detector 209 checks the flag to determine whether the utterance text is processed or not. The flag is not needed, provided that similarity information updating processing is executed for an unprocessed dialog history.

In step S302, the similar utterance detector 209 determines whether a similar utterance is included in the utterances of the same user ID. Whether or not a similar utterance is included is determined, for example, by calculating a similarity based on the edit distance between words of the following two sentences: an utterance text of an utterance given by a user and related to a processing target; and an utterance text of an utterance given by the same user last time. In place of the last utterance of the same user, an utterance given subsequently may be used. That is, an utterance immediately before and after a given utterance may be used. Alternatively, a similarity may be calculated based on the cosine distance of word vectors, or a semantic similarity between phrases may be considered. As can be seen, a general method for calculating a similarity between sentences may be used. If the similarity is a threshold or more, the similar utterance detector 209 can determine that a similar utterance is present. If a similar utterance is detected, step S303 is executed; if no similar utterance is detected, the processing is brought to an end.

In step S303, the similar utterance detector 209 groups similar utterances, thereby creating similar utterance groups.

In step S304, the similarity information updater 210 extracts user's utterances determined to result in a successful dialog from each of the similar utterance groups. In other words, the similarity information updater 210 extracts utterances to which correct utterance intentions are assigned. In general, if a system response to a user's utterance is inadequate, the user is very likely to think that the dialog system failed to interpret the intention of the user's utterance. In many of such cases, the user restates the same utterance, using a slightly different expression. If the restated user's utterance is correctly interpreted by the dialog system, the next dialog is processed. As can be seen from this, the utterance intention corresponding to the latest user's utterance (i.e., the user's utterance appearing last in the time-series utterances) is considered to accord to the user's utterance intention with high probability.

In the present embodiment, therefore, the latest utterance text in each similar utterance group is regarded as a representative similar utterance, and an inferred utterance intention corresponding to the representative similar utterance is processed as an intention candidate. The representative similar utterance, the intention candidate and the utterance texts of the similar utterance group other than the representative similar utterance, are associated with one another, and the data stored in the similarity information storage 212 is updated based on the resultant data. Then, the similarity information updating processing performed by the learning apparatus 200 is brought to an end.

Next, a first example of the dialog history stored in the dialog history storage 208 will be described with reference to FIG. 4.

Figures 4, 5:
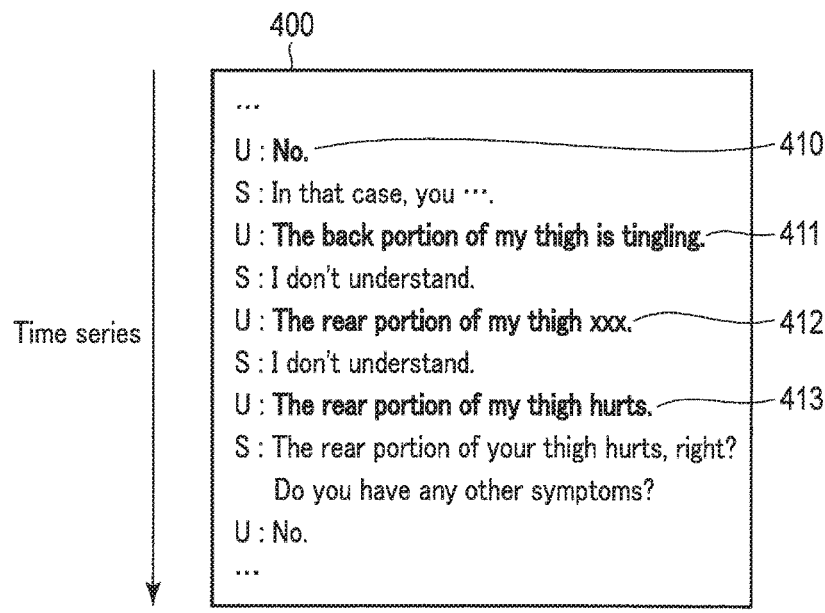
FIG. 4 shows a first example of a dialog history stored in a dialog history storage.
FIG. 5 shows a first example of similarity information stored in a similarity information storage.

In the dialog history 400 shown in FIG. 4, the utterance texts of utterances of the same user ID (i.e., the texts beginning with "U:") and response texts of system responses to the user's utterances (i.e., the text beginning with "S:") are arranged in time series as pairs.

A first example of the similarity information stored in the similarity information storage 212 will be described with reference to FIG. 5.

The table 500 shown in FIG. 5 is a table including similarity information 501 as one entry. The similarity information 501 includes an utterance text 502, a representative similar utterance 503, an intention candidate 504, and a frequency of appearance 505 (used as a certainty degree), and these data are associated with one another.

The utterance text 502 is a text obtained by performing speech recognition of a user's utterance. The representative similar utterance 503 is the latest utterance text of the similar utterance group. The intention candidate 504 is the inferred utterance intention corresponding to the representative similar utterance 503. The frequency of appearance 505 represents the number of times the pair made up of (i) the utterance text 502 of the same similar utterance group other than the representative similar utterance and (ii) the intention candidate 504 of the similar utterance group to which the utterance text 502 belongs appears in the dialog history. Although the frequency of appearance is taken as an example of a certainty degree, this is just exemplary. A weight or another value may be suitably used as a certainty degree, provided that the degree to which an intention candidate is the intention of an utterance text can be evaluated.

To be more specific, the utterance text 502 is "the back portion of my thigh is tingling", the intention candidate 504 is "pain (thigh)", the representative similar utterance 503 is "the rear portion of my thigh hurts", and the frequency of appearance 505 is "20." These data are associated with one another, constituting one entry of the similarity information 501.

In the present embodiment, the intention candidate 504 includes an intention tag representing the utterance intention of the user and additional information. To be more specific, the intention tag of the intention candidate 504 "pain (thigh)" is "pain", and the additional information is "thigh." In this example, the intention tag indicates a symptom, and the additional information indicates a body portion where the symptom appears.

Next, a first example of the similarity information updating processing performed by the learning apparatus 200 will be described with reference to FIGS. 4 and 5.

In the descriptions below, reference will be made to the case where the similarity information updating processing is performed, with the dialog history 400 shown in FIG. 4 regarded as an unprocessed dialog history. As the processing in step S302 shown in FIG. 3, reference will be made to the case where the similarity between a target utterance text and an utterance text immediately preceding the target utterance text (namely, the utterance text of the utterance given last time) is determined using the cosine distance of a word vector. The reason for comparing the target utterance text and the utterance text of the utterance given last with each other is that these two utterances are considered highly related to each other. If the time between two utterances is long, there is little probability that the second utterance is a restated utterance entered in response to the system's error in inferring an utterance intention. In order to enhance the inference accuracy of an utterance intention, therefore, it is desirable to compare utterances which are as close as possible to each other.

To determine the similarity with respect to the user's utterance text 411 "the back portion of my thigh is tingling", the similar utterance detector 209 compares that utterance text 411 with the immediately preceding utterance text 410 "No." First, the similar utterance detector 209 performs morphological analysis of the two utterance texts for which the similarity is to be determined, and extracts morphemes featuring the utterances, including nouns, verbs and adjectives, thereby generating word vectors. For example, in the case where the utterance text 410 is "No", the word vector is (No). In the case where the "the back portion of my thigh is tingling", the word vector is (back portion, thigh, is, tingling).

Subsequently, the similar utterance detector 209 generates a vector (No, back portion, thigh, is, tingling), which includes all elements of the two word vectors. The appearance frequencies of the elements of the word vectors can be represented as follows:

utterance text 410: (1, 0, 0, 0, 0)
utterance text 411: (0, 1, 1, 1, 1)

The similar utterance detector 209 determines a cosine distance between the two vectors. The cosine distance between vectors V1 and V2 is calculated as follows:

$$\text{Cosine Distance } \cos(V1, V2) = V1 \cdot V2 / |V1||V2| \quad (1)$$

The cosine distance between the above utterance texts 410 and 411 can be obtained using formula (1), as 0/(1*2)=0. Likewise, the cosine distance between the utterance text 412 "the rear portion of my thigh xxx" and the utterance text 411 "the back portion of my thigh is tingling", and the cosine distance between the utterance text 413 "the rear portion of my thigh hurts" and the utterance text 412 "the rear portion of my thigh xxx" can be represented as shown in Table 1. It is to be noted that the utterance text 412 "the rear portion of my thigh xxx" is a text based on an incorrect speech recognition result.

TABLE 1

| Utterance text | Vector representation element | Vector representation | Cosine distance |
|---|---|---|---|
| 412 | (rear portion(back potion), thigh, xxx, be(is), tingling) | (1, 1, 1, 0, 0) (1, 1, 0, 1, 1) | 0.58 |
| 411 | | | |
| 413 | (rear portion, thigh, ,hurts, xxx) | (1, 1, 1, 0) (1, 1, 0, 1) | 0.67 |
| 412 | | | |

If the two word vectors contain synonyms that are semantically similar, such synonyms are processed as the same element. For example, when the cosine distance between the utterance text 412 and the utterance text 411 is calculated, the "back portion" and the "rear portion" are synonyms and processed as the same element. Determination of synonyms may be made using a general thesaurus.

Determination of whether two target sentences are similar may be made by checking whether a calculated cosine distance is greater than a predetermined threshold. Assuming that the threshold is "0.5", the utterance text 410 "No" and the utterance text 411 "the back portion of my thigh tingling" are not similar utterances. On the other hand, the utterance texts 411, 412 and 413 can be determined to be similar utterances including a series of utterances. In the case of this example, therefore, utterance texts 411, 412 and 413 are generated as one similar utterance group.

In the example shown in FIG. 4, the last utterance text 413 "the rear portion of my thigh hurts" of the series of utterance texts (411, 412, 413) is responded to by the system as "The rear portion of your thigh hurts, right? Do you have any other symptoms?" Where the user thinks that the intention inference of the system is correct, the user gives the next utterance "No." Therefore, the similarity information updater 210 determines that the utterance text 413 "the rear portion of my thigh hurts" is a representative similar utterance, and determines that the utterance intention "pain (thigh)" is an utterance intention corresponding to the utterances of the similar utterance group including the utterance in question, namely, an intention candidate.

The similarity information updater 210 determines representative similar utterances with respect to all similarity utterance groups generated, and then updates the similarity information, referring to the similarity information storage 212. To be more specific, the similarity information updater 210 determines whether the similarity information storage 212 stores an entry which includes an utterance text 502 identical to an utterance text of the similar utterance group other than the representative similar utterance and which includes an intention candidate 504 identical to an utterance intention inferred to the representative similar utterance. This determination is made for each of the similar utterance groups.

If such an entry is present, the value of the frequency of appearance 505 is incremented by one. If such an entry is not present, it is added to the similarity information storage 212 as a new entry, and the frequency of appearance 505 of the new entry is set as "1."

In the example of the dialog history 400 shown in FIG. 4, only one similar utterance group is contained, namely, the group made up of utterance texts 411, 412 and 413. The representative similar utterance of the similar utterance group is utterance text 413, as described above. Therefore, the similarity information updater 210 determines whether the similarity information includes an entry corresponding to utterance texts 411 and 412. If an entry applicable to the utterance text 411 "the back portion of the thigh is tingling"

and the utterance intention "pain (thigh)" is detected and the frequency of appearance of the entry is "19", then the similarity information updater 210 changes the frequency of appearance of that entry to "20." If an entry applicable to the utterance text 412 "the rear portion of my thigh xxx" and the utterance intention corresponding to utterance text 413 is not detected, then it is added as a new entry, like the entry 506 shown in FIG. 5.

Next, a second example of the similarity information updating processing of a dialog history will be described with reference to FIGS. 6 and 7.

Figures 6, 7:
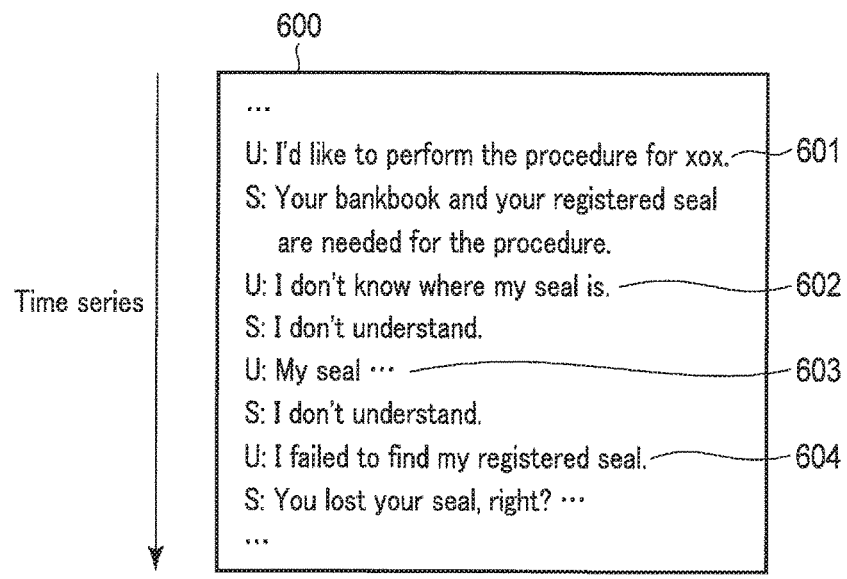
FIG. 6 illustrates a second example of a dialog history.
FIG. 7 illustrates a second example of similarity information.

FIG. 6 shows a second example of a dialog history 600. In the dialog history 600, it is confirmed that user's bankbook and registered seal are needed for the procedure at a financial institution and that they are kept on hand by the user. A similarity is calculated for each of utterance texts. To be specific, the similarity between the utterance text 602 "I don't know where my seal is" and the utterance text 601 "I'd like to perform the procedure for xOx", the similarity between the utterance text 603 "my seal is . . . " and the utterance text 602 "I don't know where my seal is", and the similarity between the utterance text 604 "I lost my registered seal" and the utterance text 603 "my seal is . . . ", are shown in Table 2.

TABLE 2

| Utterance text | Vector representation element | Vector representation | Similarity |
|---|---|---|---|
| 602 | (don't, know, where, seal, be(is), would like to, perform, procedure, xox) | (1, 1, 1, 1, 1, 0, 0, 0, 0) | 0 |
| 601 | | (0, 0, 0, 0, 0, 1, 1, 1, 1) | |
| 603 | (seal, be(is), don't, know, where) | (1, 1, 0, 0, 0) | 0.63 |
| 602 | | (1, 1, 1, 1, 1) | |
| 604 | (lose, registered seal(seal) ,be(is)) | (1, 1, 0) | 0.5 |
| 603 | | (0, 1, 1) | |

Assuming that the threshold for similarity determination is "0.5" as in the example shown in FIG. 4, utterance text 602 and utterance text 603 are regarded as similar, and utterance text 603 and utterance text 604 are regarded as similar. These utterance texts 602, 603 and 604 are generated as a similarity utterance group.

FIG. 7 shows a second example of similarity information corresponding to FIG. 6. The similarity information updater 210 performs processing in a similar manner to that of FIG. 5.

Next, a third example of the similarity information updating processing performed by the learning apparatus 200 will be described with reference to FIGS. 8 and 9.

Figures 8, 9:
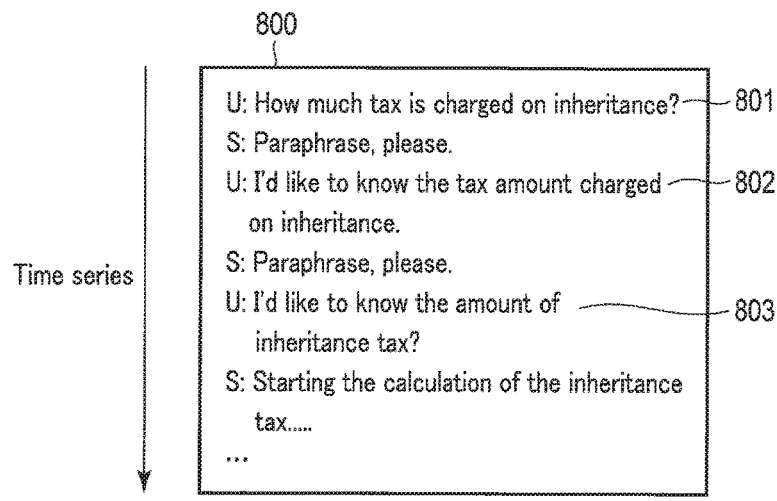
FIG. 8 illustrates a third example of a dialog history.
FIG. 9 illustrates a third example of similarity information.

FIG. 8 shows a third example of a dialog history, and is part of the dialog history in which a computation simulation of an inheritance tax is requested in an advice service at a financial institution. In this example, the utterance text 801 "How much tax is charged on inheritance?", the utterance text 802 "I'd like to know the tax amount charged on inheritance" and the utterance text 803 "I'd like to know the amount of inheritance tax?" can be represented as in Table 3.

TABLE 3

| Utterance text | Vector representation element | Vector representation | Similarity |
|---|---|---|---|
| 802 | (would like to, know, tax, amount, charge, inheritance, how much, be(is)) | (1, 1, 1, 1, 1, 1, 0, 0) | 0.55 |
| 801 | | (0, 0, 1, 0, 1, 1, 1, 1) | |
| 803 | (would like to, know, amount, inheritance, tax, charge) | (1, 1, 1, 1, 1, 0) | 0.91 |
| 802 | | (1, 1, 1, 1, 1, 1) | |

Assuming that the threshold for similarity determination is "0.5" as in the example shown in FIG. 4, utterance text 801 and utterance text 802 are regarded as similar, and utterance text 802 and utterance text 803 are regarded as similar. These utterance texts 801, 802 and 803 are generated as a similarity utterance group.

FIG. 9 shows a third example of similarity information corresponding to FIG. 8. The similarity information updater 210 performs processing in a similar manner to that of FIG. 5.

Next, the utterance registration processing performed by the learning apparatus 200 of the first embodiment will be described with reference to the flowchart of FIG. 10.

In step S1001, the utterance receiver 201 receives an utterance text representing speech recognition results (the text will be referred to as a first text as well).

In step S1002, the intention analyzer 202 performs intention analysis for the first text, and determines an utterance intention for a user's utterance.

In step S1003, the similarity information detector 203 refers to the similarity information storage 212 and determines whether the storage 212 stores an entry including an utterance text similar to the first text. If such an entry is stored, the control flow advances to step S1004. If such an entry is not stored, the control flow advances to step S1009 on the assumption that the utterance intention of the user's utterance is the same as the utterance intention inferred in step S1002.

In step S1004, the similarity information detector 203 extracts an entry including an utterance text identical to the first text.

In step S1005, the intention corrector 204 determines whether the extracted entry satisfies the condition required. In this example, the intention corrector 204 determines whether the frequency of appearance of the entry is a predetermined threshold or more. If the frequency of appearance is the predetermined threshold or more, the control flow advances to step S1006. If not, the control flow advances to step S1009 on the assumption that the utterance intention of the user's utterance is the same as the utterance intention inferred in step S1002.

In step S1006, the intention corrector 204 corrects the utterance intention as an intention candidate included in the extracted entry.

In step S1007, the utterance register 205 registers a pair made up of the utterance text and the corrected utterance intention in the utterance intention information storage 213.

In step S1008, the similarity information updater 210 receives from the utterance register 205 a flag indicating that utterance intention information has been stored, and causes the similarity information storage 212 to register an utterance text included in the entry and information representing that the intention candidate is stored in the utterance intention information. This is accomplished, for example, by associating a flag representing utterance intention information having been stored with an entry stored in the similarity information storage 212.

In step S1009, the dialog controller 206 performs dialog processing, using the first text and a corrected utterance intention (if no correction is made, the utterance intention inferred in step S1002).

In step S1010, the response generator 207 converts a dialog processing result into a response message, and outputs this response message to the user. The utterance registration processing by the learning apparatus 200 is completed in the above manner.

An example of utterance intention information stored in the utterance intention information storage 213 will be described with reference to FIG. 11.

The utterance intention information 1101 shown in FIG. 11 includes an utterance information identifier 1102 and an utterance text 1103. The utterance information identifier 1102 includes an intention tag and additional information. To be specific, in the utterance intention information 1101, the utterance intention identifier 1102 "swell (eyelid)" and the utterance text 1103 "my eyelid has become swollen" are associated with each other.

A description will be given of the case where the user utters "the back portion of my thigh is tingling" to the system on the assumption that the similarity information includes such entries as are contained in the similarity information shown in FIG. 5 and that the threshold (the value of the frequency of appearance) used in step S1005 of FIG. 10 is "20."

In this case, the similarity information detector 203 detects an entry of the similarity information 501 corresponding to the utterance text of the user's utterance in step S1003 shown in FIG. 10. In addition, the intention corrector 204 compares the frequency of appearance of the similarity information 501 with a threshold in step S1005. Since the frequency of appearance of the similarity information 501 is "20" and therefore satisfies the condition, the intention corrector 204 corrects the utterance intention. In step S1006, the utterance register 205 registers a pair made up of (i) the utterance text "the back portion of my thigh is tingling" of the user's utterance and (ii) the intention candidate "pain (thigh)" included in the intention candidates 504 of the similarity information 501 as an entry 1104 of the utterance intention information. The utterance register 205 may register a pair made up of (i) the intention tag "pain" included in the intention candidate 504 of the similarity information 501 and (ii) the utterance text.

Before an entry is registered, the utterance register 205 may check for a flag indicating whether the data corresponding to the entry of the similarity information is reflected in the utterance intention information. If the flag is not set, the utterance register 205 registers the entry.

Where the utterance register 205 registers the utterance text and the utterance intention identifier in the utterance intention information, the similarity information updater 210 may delete entries of the similarity information including corresponding utterance texts from the similarity information storage 212, based on the utterance text and the utterance intention identifier received from the utterance register 205. In that case, the data amount can be reduced.

The similarity information stored in the similarity information storage 212 may include date information indicating the date when an entry of the similarity information is generated. Where the similarity information includes such date information, the similarity information updater 210 may delete similarity information after the elapse of a predetermined first time duration from the date indicated by the date information. Since data regarding rarely-given utterances can be deleted, the data amount can be reduced, accordingly.

According to the first embodiment described above, the intention candidate of a representative similar utterance included in similarity information is referred to, and the utterance intention inferred with respect to the user's utterance is corrected. With this feature, an appropriate utterance intention can be assigned to an utterance whose intention cannot be inferred, with no need for the user's restatement or correction. Accordingly, the data preparation cost for the intention inference can be reduced, and the data that can be used for the intention inference of utterances can be increased.

(Second Embodiment)

The second embodiment differs from the first embodiment in that whether the intention corrected by the intention corrector 204 is correct or not is confirmed by the user.

A learning apparatus according to the second embodiment will be described with reference to the block diagram shown in FIG. 12.

The learning apparatus 1200 of the second embodiment includes an utterance receiver 201, a similarity information detector 203, an intention corrector 204, an utterance register 205, a dialog controller 206, a response generator 207, a similarity information updater 210, a similar utterance detector 209, an intention analysis information storage 211, a dialog history storage 208, a similarity information storage 212, an utterance intention information storage 213, an intention analyzer 1201 and an intention confirmation unit 1202.

Except for the intention analyzer 1201 and the intention confirmation unit 1202, the elements of the learning apparatus of the second embodiment perform the same operations as those mentioned in connection with the first embodiment, and a description of such elements will be omitted.

Although the intention analyzer 1201 performs an operation similar to that of the intention analyzer 202 of the first embodiment, it determines whether or not the dialog processing is for intention confirmation by referring to a flag. If the dialog processing is for intention confirmation, it sends a user's utterance to the intention confirmation unit 1202. If the dialog processing is not for intention confirmation, it sends the user's utterance and an utterance intention to the similarity information detector 203.

Upon receipt of an utterance text and a corrected utterance intention from the intention corrector 204, the intention confirmation unit 1202 asks the user whether the corrected utterance intention is acceptable. If a user's utterance confirming that the corrected utterance intention is acceptable is received from the intention analyzer 1201, the intention confirmation unit 1201 sends the utterance text and the corrected utterance intention to the utterance register 205.

Next, the utterance registration processing performed by the learning apparatus 1200 of the second embodiment will be described with reference to the flowchart of FIG. 13.

Since the processing other than steps S1301 to S1305 is similar to the processing shown in FIG. 10, a description of such similar processing will be omitted.

In step S1301, the intention analyzer 1201 determines whether the user is being asked to confirm the acceptability of the utterance intention. This can be ascertained by checking whether or not a flag (mentioned later) is present. If a check for confirmation of the utterance intention is being performed, the control flow advances to step S1302. If the check is not being performed, the control flow advances to step S1003.

In step S1302, the intention confirmation unit 1202 determines whether the utterance intention is correct, namely, whether the user's utterance is "affirmative." This determination can be made by checking whether the utterance intention to the user's utterance inferred in step S1002 is "affirmative" or not. Where the user's utterance is "affirmative", the control flow advances to step S1007, in which the user's utterance (about which a check for confirmation is being carried out) and an intention candidate are stored in the utterance intention information storage 213. Then, the user's utterance, intention candidate, flag etc. stored in a buffer or the like for confirmation are deleted. If the user's utterance does not represent "affirmative", the control flow advances to step S1303.

In step S1303, the intention confirmation unit 1202 determines whether the user's utterance represents "correction." For example, if the user utters "It is not tingling but throbbing", it is determined that the user's utterance represents "correction." If the user's utterance is determined to represent "correction", the control flow advances to step S1008, in which the user's utterance and the utterance intention corrected by the user (e.g., the utterance intention corresponding to "throbbing") are stored in the similarity information storage 212. In subsequent step S1009, the dialog controller 206 receives the user's utterance and the corrected utterance intention. After they are stored, the user's utterance, intention candidate, flag etc. stored in a buffer or the like for confirmation are deleted. If the user's utterance does not represent "correction", the control flow advances to step S1304.

In step S1304, the intention confirmation unit 1202 determines whether the user denies the utterance intention. Where the user's utterance indicates "denial", the control flow advances to step S1009. In this step, the intention confirmation unit 1202 transfers the utterance text of the user's utterance and the utterance intention inferred from the user's utterance and retained in a buffer or the like for confirmation to the dialog controller 206. The user's utterance, intention candidate, flag, etc., which have been retained in a buffer or the like for confirmation, are deleted. Where the user's utterance does not indicate "denial", the confirmation of the utterance intention of the user's utterance is regarded as having failed. In this case, the user's utterance, intention candidate, flag, etc. are kept retained, and the control flow advances to step S1305. If utterances that do not represent any one of "affirmative", "correction" and "denial" continue for more than a predetermined number of times, the user's intention may be regarded as "denial."

In step S1305, the intention confirmation unit 1202 requests that the user confirm whether or not the intention of the user's utterance can be regarded as the intention candidate recorded in an entry of the extracted similarity information without any problem. This is accomplished, for example, by defining an utterance intention used for confirming the utterance intention of a user, and by performing dialog processing in step S1010 on the basis of the defined utterance intention, the user's utterance text and intention candidate (which are additional information). At the time, a flag indicating the start of a dialog for the confirmation of an utterance intention may be recorded in the learning apparatus 1200, together with the utterance text of the user's utterance, the inferred utterance intention and the entries of similarity information.

An example of the similarity information stored in the similarity information storage 212 of the second embodiment will be described with reference to FIG. 14.

The similarity information shown in FIG. 14 differs from the similarity information shown in FIG. 5 in that information indicating that an intention is corrected by the user is added. To be specific, in the similarity information 1402, the intention candidate "throbbing (thigh)" is added to the utterance text 502 "the back portion of my thigh is tingling." In this case, the utterance text 502 "the back portion of my thigh is tingling" and the utterance intention corrected by the user ("throbbing (thigh)") are transferred to the dialog controller 206.

As described above, according to the second embodiment, the user is requested to confirm the correction to an utterance intention. In the subsequent processing, therefore, an utterance intention can be inferred with higher accuracy, resulting in the reduction of the data preparation cost.

(Third Embodiment)

The third embodiment differs from the foregoing embodiments in that the data stored in an utterance intention information storage is fed back to an intention analysis information storage.

A learning apparatus according to the third embodiment will be described with reference to the block diagram shown in FIG. 15.

The learning apparatus 1500 shown in FIG. 15 includes an utterance receiver 201, an intention analyzer 202, a similarity information detector 203, an intention corrector 204, an utterance register 205, a dialog controller 206, a response generator 207, a dialog history storage 208, a similar utterance detector 209, a similarity information updater 210, an intention analysis information storage 211, a similarity information storage 212, an utterance intention information storage 213 and an intention analysis information updater 1501 (referred to as a second updater as well).

Except for the intention analysis information updater 1501, the elements of the learning apparatus 1500 of the third embodiment perform the same operations as those mentioned in connection with the first embodiment, and a description of such elements will be omitted.

The intention analysis information updater 1501 adds data stored in the utterance intention information storage 213 to the data stored in the intention analysis information storage 211 in current use, and updates the data stored in the intention analysis information storage 211. Owing to this feature, new intention analysis information is generated, and the current intention analysis information is updated. The frequency of updating may be determined beforehand.

As described above, according to the third embodiment, the intention analysis information updater 1501 updates the data stored in the intention analysis information storage 211 at predetermined intervals, using an utterance text and an utterance intention. Owing to this feature, the number of utterances about which the system can correctly infer utterance intentions can be increased automatically.

(Fourth Embodiment)

The fourth embodiment differs from the foregoing embodiments in that ambiguity of a user's utterance is detected and a message is transmitted to the system administrator of the dialog system.

Figure 16:
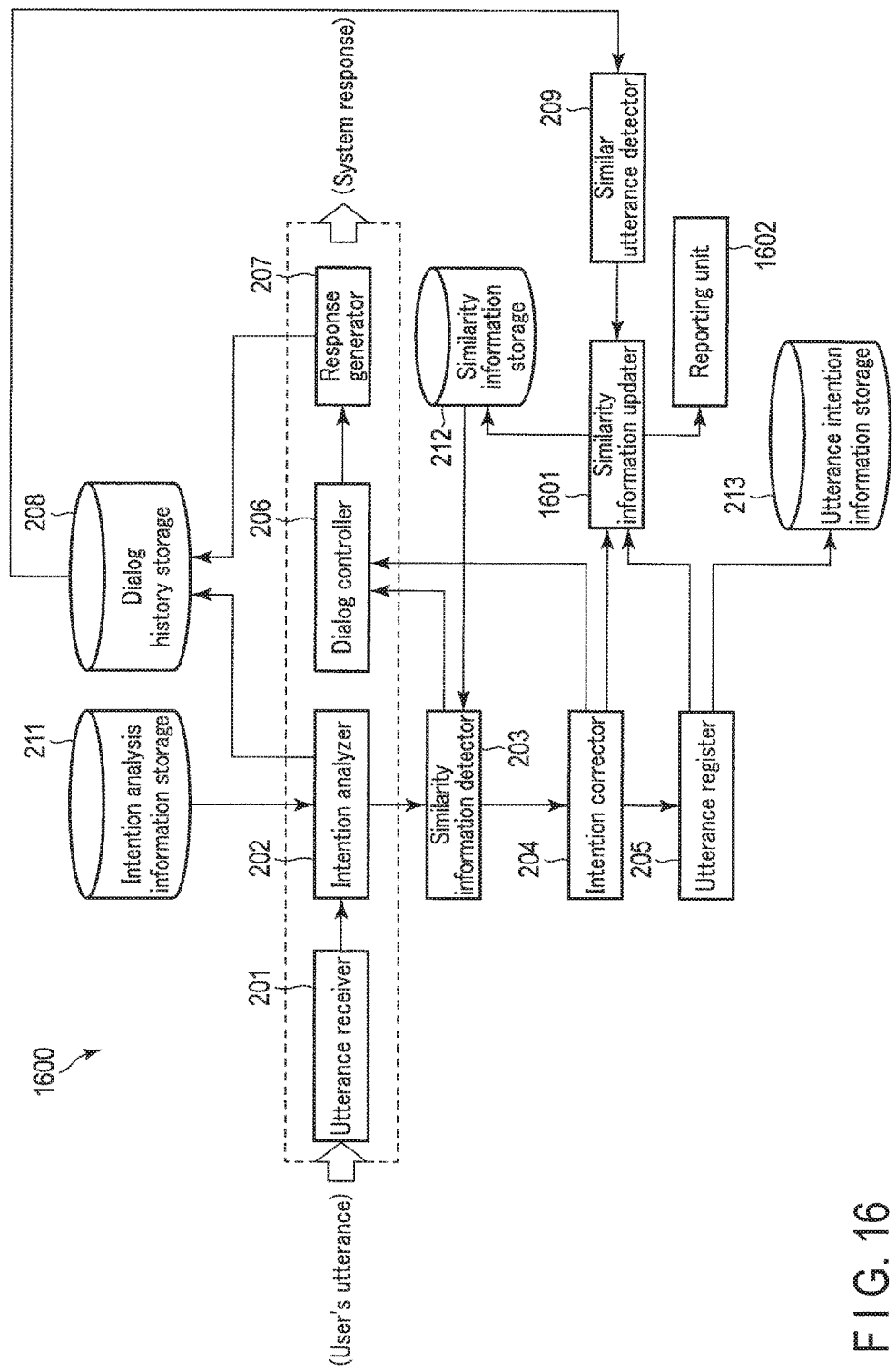
FIG. 16 is a block diagram illustrating a learning apparatus according to a fourth embodiment.

A learning apparatus according to the fourth embodiment will be described with reference to the block diagram shown in FIG. 16.

The learning apparatus 1600 of the four embodiment includes an utterance receiver 201, an intention analyzer 202, an intention corrector 204, an utterance register 205, a dialog controller 206, a response generator 207, a dialog history storage 208, a similar utterance detector 209, a similarity information detector 203, an intention analysis information storage 211, a similarity information storage 212, an utterance intention information storage 213, a similarity information updater 1601, and a reporting unit 1602.

Except for the similarity information updater 1601 and the reporting unit 1602, the elements of the learning apparatus of the fourth embodiment perform the same operations as those mentioned in connection with the first embodiment, and a description of such elements will be omitted.

The similarity information updater 1601 performs substantially similar operations to those of the similarity information updater 210, but differs therefrom in that it determines whether or not each of updated similarity information entries satisfies the condition for reporting to the administrator.

Where the similarity information updater 1601 determines that an entry of similarity information satisfies the condition for reporting to the system administrator, the reporting unit 1602 sends to the system administrator a message to the effect that the utterance intention of an utterance text is ambiguous.

A first example of the condition for reporting to the administrator with respect to the ambiguity of a user's utterance will be described with reference to FIGS. 17 and 18.

Figures 17, 18:
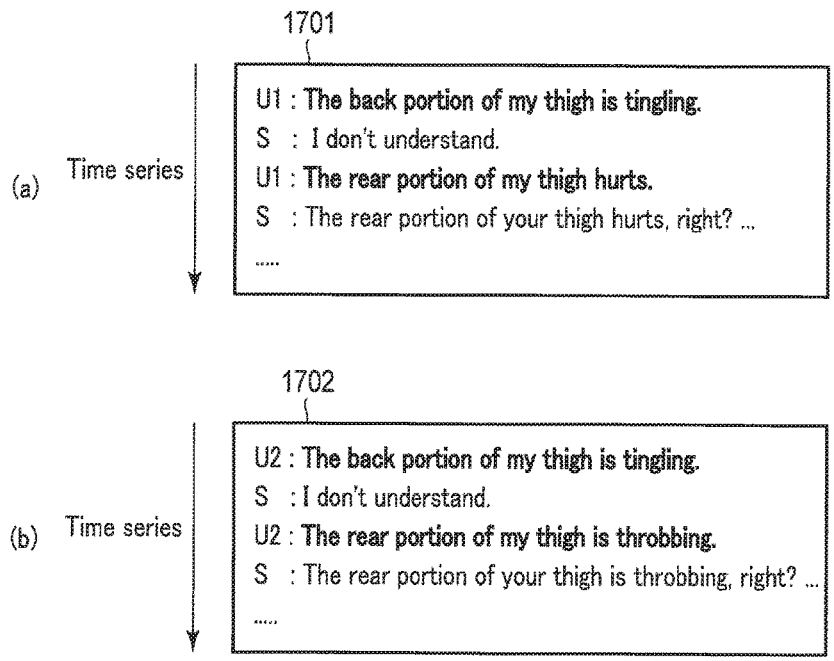
FIG. 17 illustrates a first example of part of a dialog history according to the fourth embodiment.
FIG. 18 illustrates similarity information corresponding to the dialog history shown in FIG. 17.

FIG. 17 illustrates a first example of part of a dialog history according to the fourth embodiment. Dialog history 1701 and dialog history 1702 include utterance texts of different user IDs extracted from the dialog history storage 208. A pair made up of (i) the utterance text of a user's utterance and (ii) a response text the system generates in response to the user's utterance are arranged in time series.

In dialog history 1701, the utterance of user U1 "the back portion of my thigh is tingling" is intended to mean that "the rear portion of my thigh hurts." On the other hand, in dialog history 1702, the utterance of user U2 "the back portion of my thigh is tingling" is intended to mean that "the rear portion of my thigh is throbbing."

In similarity information 1801 and similarity information 1802 shown in FIG. 18, examples of entries of similarity information corresponding to dialog histories 1701 and 1702 are shown. It is assumed that the condition for reporting to the administrator is "there are similarity information entries in which the utterance texts of user's utterances are identical and the intention candidates are different (in other words, there are two or more corresponding similarity information) and the certainty degrees (appearance frequencies) of the respective entries are a predetermined threshold or more." In the example shown in FIGS. 17 and 18, there are entries wherein the utterance text "the back portion of my thigh is tingling" corresponds to two intention candidates "pain (thigh)" and "throbbing (thigh)." Where the threshold is "11", the appearance frequencies exceed the threshold.

Thus, the system administrator is notified that the utterance "the back portion of my thigh is tingling" may be used to convey one of the two intentions "pain" and "throbbing." The report to the system administrator can be performed in various methods, including the transmission of an email and the addition of new information to administrator report information (in which notifications to the administrator are accumulated). If a flag is set for the entry of similarity information about which report to the administrator is performed, the same information is prevented from being reported again.

Next, a second example of the condition for reporting to the administrator with respect to the ambiguity of a user's utterance will be described with reference to FIGS. 19 and 20.

FIG. 19 illustrates a second example of part of a dialog history according to the fourth embodiment. In the dialog history 1901 shown in FIG. 19, (i) utterance texts of the same user ID extracted from the dialog history storage 208 and (ii) response texts the system generates in response to the user's utterances are arranged in time series as pairs.

In the dialog history 1901, the utterance text 1902 of the user's utterance is "the back portion of my thigh is tingling", and the response text 1903 of the response made to the utterance text is "The rear portion of your thigh hurts, right?" In this example, the system assumes that the utterance intention of the utterance text 1902 is related to "pain", and the dialog continues based on this utterance intention.

However, the next utterance text 1904 is "No, the back portion of my thigh is throbbing." In this utterance, the user mentions that the problem is not "pain" but "throbbing." Where the dialog continues based on the intention inferred by the system, as in utterance text 1904, the determination as to whether utterance text 1904 is a similar utterance with respect to utterance text 1902 may be made not only based on the similarity between the utterances but also in consideration of whether the utterance text 1904 includes a negative expression, such as "No, the back portion of my thigh is throbbing."

In the similarity information 2001 shown in FIG. 20, an example of an entry of similarity information corresponding to dialog history 1901 is shown. A user's utterance inference intention 2002 is added to the similarity information 2001.

Where, as in the examples shown in FIGS. 19 and 20, the utterance intention inferred in response to the user's utterance differs from the actual intention, the user's utterance may be used to convey one of two or more possible intentions, as in the case where two or more intention candidates correspond to a single utterance of the user. In this case, the condition for reporting to the system administrator is "the user's utterance inference intention and the intention candidate differ from each other, and the certainty degree (the frequency of appearance) of the combination between the user's utterance inference intention and the intention candidate is a predetermined threshold or more." Assuming that the threshold is "30", the example of the entry in the similarity information 2001 shown in FIG. 20 satisfies the condition. Thus, the system administrator is notified that the utterance "the back portion of my thigh is tingling" may be used to convey one of the two intentions "pain" and "throbbing."

Figure 21:
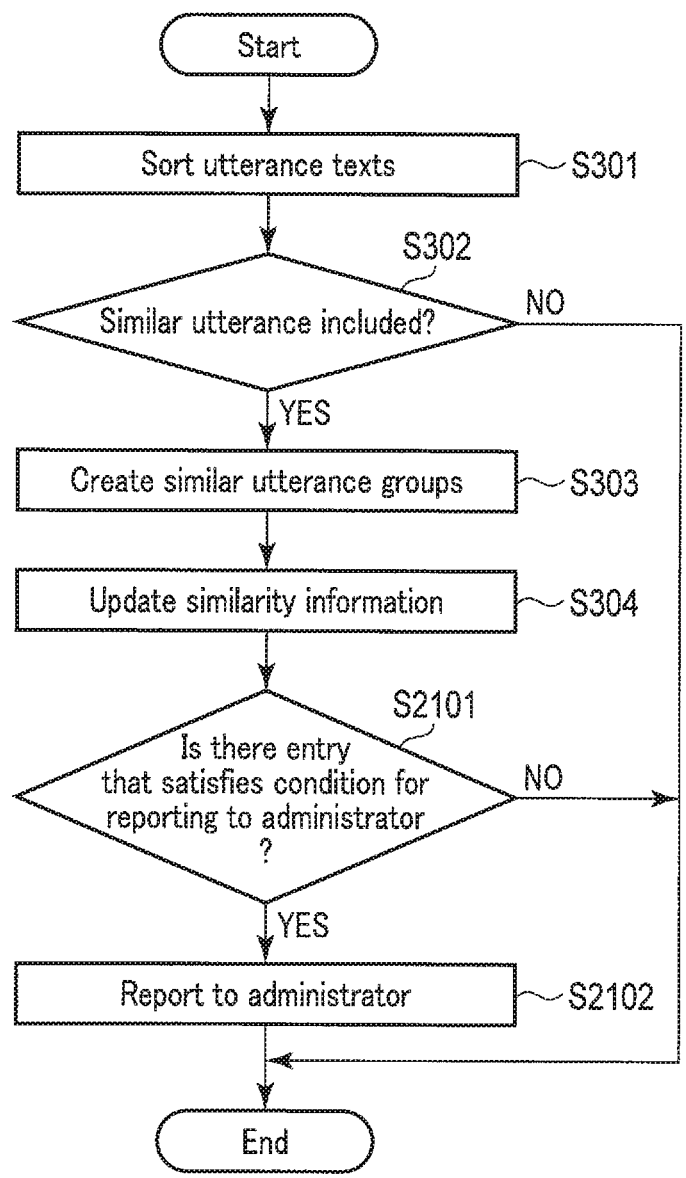
FIG. 21 is a flowchart illustrating similarity information updating processing performed by the learning apparatus of the fourth embodiment.

Next, the similarity information updating processing performed by the learning apparatus 1600 of the fourth embodiment will be described with reference to the flowchart of FIG. 21.

Except for step S2101 and step S2102, the processing is similar to that of the flowchart shown in FIG. 3, and a description of such similar processing will be omitted.

In step S2101, the similarity information updater 1601 checks an updated similarity information entry and determines whether or not there is an entry of similarity information that satisfies the condition for reporting to the administrator. Where the utterances are those of different user IDs, the condition for reporting to the administrator is "there are similarity information entries in which the utterance texts of user's utterances are identical and the intention candidates are different and the appearance frequencies of the respective entries are a predetermined threshold or more." Where the utterances are those of a single user ID, the condition for reporting to the system administrator is "the user's utterance inference intention and the intention candidate differ from each other, and the certainty degree (the frequency of appearance) of the combination between the user's utterance inference intention and the intention candidate is a predetermined threshold or more." If an entry satisfying the condition is present, the control flow advances to step S2102. If such an entry is not present, the processing is ended.

In step S2102, the reporting unit 1602 sends a message to the system administrator.

According to the fourth embodiment described above, where the similarity information includes an entry in which the same utterance text corresponds to a plurality of intention candidates, and the frequency of appearance of that entry exceeds the threshold, the system administrator is notified that the utterance text is a text of an ambiguous utterance. Accordingly, the system administrator can carefully examine the data stored in the intention analysis information storage 211, the accuracy of the intention analysis can be enhanced, and the amount data required can be decreased.

In the first to fourth embodiments described above, the terminal 101 shown in FIG. 1 may have the functions provided by a speech recognition server, a speech synthesis server and a dialog processing server 102.

The learning apparatus of each of the embodiments may be included in the dialog processing server 102 shown in FIG. 1; alternatively, it may be included in a server different from the dialog processing server 102. Where the learning apparatus 200 is included in the dialog processing server 102 or in a different server, the terminal 101 may include a speech acquiring unit (such as a microphone), a display for displaying an interface window and a communication unit for performing data communications. Where the dialog processing server 102 is dedicated to the dialog system processing, the learning apparatus may be included in the terminal 101.

The instructions included in the steps described in the foregoing embodiments can be implemented based on a software program. It is possible to configure a general-purpose computer system to store this program in advance and to read the program in order to attain the same advantage as the above-described learning apparatuses. The instructions described in the above embodiments are stored in a magnetic disc (flexible disc, hard disc, or the like), an optical disc (CD-ROM, CD-R, CD-RW, DVD-ROM, DV+R, DVD+RW, Blu-ray (registered trademark) disc, or the like), a semiconductor memory, or a similar storage medium. As long as the storage medium is readable by a computer or by a built-in system, any storage format can be used. Operations similar to those of the learning apparatuses of the above-described embodiments can be realized if a computer reads a program from the storage medium, and executes the instructions written in the program on the CPU based on the program. Needless to say, the computer may acquire or read the program by way of a network.

Furthermore, an operating system (OS) running on a computer, database management software, middleware (MW) of a network, etc. may execute a part of processes for realizing the present embodiment based on instructions from a program installed from a storage medium onto a computer or a built-in system.

Moreover, the storage medium according to the present embodiment is not limited to a medium independent of a system or a built-in system; a storage medium storing or temporarily storing a program downloaded through a LAN or the Internet is also included in the storage medium according to the present embodiment.

In addition, the storage medium according to the present embodiment is not limited to one storage medium, and the processes according to the present embodiment may be carried out using multiple storage media. The storage medium or media may have any configuration.

The computer or built-in system in the present embodiment is used to execute each process in the present embodiment based on a program stored in a storage medium, and may be an apparatus consisting of a PC, a microcomputer, or the like, or a system in which a plurality of apparatuses are connected through a network.

The computer in the present embodiment is not limited to a PC; it may be a processor controller, a processing circuitry, a microcomputer, etc. included in an information processor, and is a generic name for a device and apparatus that can realize the functions described in the embodiments based on a program.

While certain embodiments have been described, these embodiments have been presented by way of example only, and are not intended to limit the scope of the inventions. Indeed, the novel methods and systems described herein may be embodied in a variety of other forms; furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions.

What is claimed is:

1. A learning apparatus that uses utterance intention of a user, the utterance intention being inferred from a first text representing results of speech recognition of the user's utterances, the learning apparatus comprising:
    a first storage which stores a plurality of similarity information items, each including at least (i) a second text representing results of speech recognition of a set of similar utterances included in a dialog history, (ii) intention candidates inferred based on utterances included in the similar utterances and considered to result in successful dialogs, and (iii) certainty degrees representing a certainty with which the intention candidates are regarded as being identical to intentions of the second text; and
    a processing circuitry configured to:
        detect a similarity information item as a corresponding similarity information item from the plurality of similarity information items, the corresponding similarity information item including a second text identical to the first text; and
        correct the utterance intention to an intention candidate included in the corresponding similarity information item when a certainty degree included in the corresponding similarity information item is not less than a threshold.

2. The apparatus according to claim 1, wherein the processing circuitry is further configured to register the first text and the corrected utterance intention as utterance intention information.

3. The apparatus according to claim 1, further comprising:
    a second storage which stores the dialog history, wherein the processing circuitry is further configured to:

extract, from the second storage, a second text regarding utterances of a single user, an intention candidate inferred based on utterance of the single user, a third text representing results of speech recognition of the utterances determined to result in the successful dialogs; and update the similarity information item including the second text identical to the third text stored in the first storage, based on the extracted second text, the extracted intention candidate and the extracted third text.

4. The apparatus according to claim 3, wherein the processing circuitry extracts a first utterance and a second utterance as the similar utterances when the first utterance and the second utterance are similar, and generates a similarity utterance group including at least one similar utterance, the second utterance being given before or after the first utterance.

5. The apparatus according to claim 4, wherein the processing circuitry selects a latest utterance from the similarity utterance group as an utterance determined to result in the successful dialogs, and determines an utterance intention regarding the latest utterance as the intention candidate inferred based on utterance of the single user.

6. The apparatus according to claim 1, wherein the processing circuitry is further configured to cause the user to confirm a pair of the first text and the corrected utterance intention.

7. The apparatus according to claim 3, wherein the processing circuitry registers the first text and the corrected utterance intention in the first storage when the user approves the corrected utterance intention as an intention of the first text.

8. The apparatus according to claim 3, wherein the similarity information item including the second text identical to the third text further includes date information representing when the similarity information is generated, and wherein the processing circuitry deletes from the first storage similarity information after elapse of a first time duration from a date indicated by the date information.

9. The apparatus according to claim 1, wherein the certainty degrees represent a frequency of appearance representing how many times a pair of (i) an intention candidate inferred from an utterance determined to result in a successful dialog and (ii) a second text of utterances other than the utterance determined to result in the successful dialog appear.

10. The apparatus according to claim 1, wherein the processing circuitry is further configured to send, to an administer, a message indicating that an utterance regarding the first text is an ambiguous utterance, when there are a plurality of corresponding similarity information items and certainty degrees of the corresponding similarity information items are not less than the threshold.

11. The apparatus according to claim 1, wherein the processing circuitry is further configured to send, to an administer, a message indicating that an utterance regarding the first text is an ambiguous utterance, when the utterance intention differs from the intention candidate and a certainty degree of a combination of the utterance intention and the intention candidate is not less than the threshold.

12. The apparatus according to claim 2, wherein the processing circuitry is further configured to update intention analysis information for inferring the utterance intention, using the utterance intention information.

13. The apparatus according to claim 12, wherein the processing circuitry deletes the corresponding similarity information item from the first storage when a correction is performed and the correction is reflected in the intention analysis information.

14. A learning method that uses utterance intention of a user, the utterance intention being inferred from a first text representing results of speech recognition of the user's utterances, the learning method comprising:

storing, in a first storage, a plurality of similarity information items, each including at least (i) a second text representing results of speech recognition of a set of similar utterances included in a dialog history, (ii) intention candidates inferred based on utterances included in the similar utterances and considered to result in successful dialogs, and (iii) certainty degrees representing a certainty with which the intention candidates are regarded as being identical to intentions of the second text;

detecting a similarity information item as a corresponding similarity information item from the plurality of similarity information items, the corresponding similarity information item including a second text identical to the first text; and correcting the utterance intention to an intention candidate included in the corresponding similarity information item when a certainty degree included in the corresponding similarity information item is not less than a threshold.

15. A non-transitory computer readable medium including computer executable instructions, wherein the instructions, when executed by a processor, cause the processor to perform a method that uses utterance intention of a user, the utterance intention being inferred from a first text representing results of speech recognition of the user's utterances, the method comprising:

storing, in a first storage, a plurality of similarity information items, each including at least (i) a second text representing results of speech recognition of a set of similar utterances included in a dialog history, (ii) intention candidates inferred based on utterances included in the similar utterances and considered to result in successful dialogs, and (iii) certainty degrees representing a certainty with which the intention candidates are regarded as being identical to intentions of the second text;

detecting a similarity information item as a corresponding similarity information item from the plurality of similarity information items, the corresponding similarity information item including a second text identical to the first text; and correcting the utterance intention to an intention candidate included in the corresponding similarity information item when a certainty degree included in the corresponding similarity information item is not less than a threshold.

* * * * *